United States Patent
Genick, II (10) Patent No.: US 7,753,633 B2
(45) Date of Patent: Jul. 13, 2010

(54) POWER SEAL BOLT ASSEMBLY

(75) Inventor: Raymond M. Genick, II, Harrison Township, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/267,882

(22) Filed: Nov. 10, 2008

(65) Prior Publication Data
US 2009/0123252 A1 May 14, 2009

Related U.S. Application Data

(60) Provisional application No. 60/987,910, filed on Nov. 14, 2007.

(51) Int. Cl.
*F16B 43/02* (2006.01)

(52) U.S. Cl. .................................. 411/542; 411/369

(58) Field of Classification Search .................. 277/644; 411/369, 542, 901, 903
See application file for complete search history.

(56) References Cited

U.S. PATENT DOCUMENTS

| | | | |
|---|---|---|---|
| 1,469,880 A | 10/1923 | Bowden |
| 1,572,770 A | 2/1926 | Colley |
| RE18,144 E | 8/1931 | Heiermann |
| 2,091,882 A | 8/1937 | Robinson |
| 2,244,976 A | 6/1941 | Tinnerman |
| 2,374,743 A | 5/1945 | Granville |
| 2,481,325 A | 9/1949 | Miller |
| 2,508,832 A | 5/1950 | McAninch |
| 2,573,498 A | 10/1951 | Scott |
| 2,577,009 A | 12/1951 | Frantz |
| 2,675,844 A | 4/1954 | Knohl |
| 2,709,470 A | 5/1955 | Knohl |
| 2,737,222 A | 3/1956 | Becker |
| 2,798,748 A | 7/1957 | Maurer |
| 2,877,817 A | 3/1959 | Rockwell |
| 2,919,736 A | 1/1960 | Kann |
| 2,919,940 A | 1/1960 | Anderson |
| 2,931,412 A | 4/1960 | Wing |
| 2,991,816 A | 7/1961 | Harbison et al. |
| 3,007,726 A | 11/1961 | Parkin |
| 3,008,368 A | 11/1961 | Hammitt et al. |

(Continued)

FOREIGN PATENT DOCUMENTS

DE      34 19 263      11/1985

(Continued)

*Primary Examiner*—Gary Estremsky
(74) *Attorney, Agent, or Firm*—Harness, Dickey & Pierce, P.L.C.

(57) ABSTRACT

A power seal bolt assembly includes a bolt having a head and a shaft having an unthreaded shaft portion and a threaded portion. A washer is fixed to the bolt proximate to the head. A compressible washer retainer frictionally engages the unthreaded shaft portion and contacts the head. The compressible washer retainer includes a retainer portion having flexible legs extending inwardly into a washer retainer through aperture. The flexible legs flex to frictionally engage the retainer portion to the unthreaded shaft portion. A compressible washer portion homogenously connected to the retainer portion is oriented to contact the washer when a bolt torque is applied. The compressible washer portion includes at least one raised ring contacting the washer to create a fluid seal at the washer; and at least one partial cavity permitting the compression washer portion to axially compress upon application of the torque.

20 Claims, 8 Drawing Sheets

U.S. PATENT DOCUMENTS

| | | | |
|---|---|---|---|
| 3,032,089 A | 5/1962 | Gutshall | |
| 3,032,370 A | 5/1962 | Moore | |
| 3,083,796 A | 4/1963 | Bell, Jr. | |
| 3,090,203 A | 5/1963 | Burget | |
| 3,093,179 A | 6/1963 | Zahodiakin | |
| 3,141,487 A | 7/1964 | Boyd | |
| 3,180,388 A | 4/1965 | Newcomer, Jr. et al. | |
| 3,221,847 A | 12/1965 | Attwood | |
| 3,232,088 A | 2/1966 | Newcomer, Jr. et al. | |
| 3,262,480 A | 7/1966 | Storch | |
| 3,289,726 A | 12/1966 | Sauter | |
| 3,366,356 A | 1/1968 | Fisher | |
| 3,397,727 A | 8/1968 | Orosz | |
| 3,447,229 A | 6/1969 | Clark | |
| 3,482,865 A | 12/1969 | Haller | |
| 3,519,279 A * | 7/1970 | Wagner | 411/542 |
| 3,583,461 A | 6/1971 | Klaus | |
| 3,584,531 A | 6/1971 | Greenleaf | |
| 3,803,793 A | 4/1974 | Dahl | |
| 3,924,955 A | 12/1975 | Barnett et al. | |
| 3,957,385 A | 5/1976 | Ullberg | |
| 3,964,531 A | 6/1976 | Schenk | |
| 3,978,759 A | 9/1976 | Bakoledis | |
| 4,014,245 A | 3/1977 | Frye et al. | |
| 4,102,030 A | 7/1978 | King, Jr. | |
| 4,125,140 A | 11/1978 | Basile | |
| 4,195,944 A | 4/1980 | Cross | |
| 4,284,379 A | 8/1981 | Chaiko | |
| 4,306,708 A | 12/1981 | Gassaway et al. | |
| 4,309,123 A | 1/1982 | Moore | |
| 4,334,599 A | 6/1982 | Ritsema et al. | |
| 4,343,581 A | 8/1982 | Millheiser | |
| 4,396,327 A | 8/1983 | Menke | |
| 4,435,112 A | 3/1984 | Becker | |
| 4,477,228 A | 10/1984 | Duffy et al. | |
| 4,518,282 A | 5/1985 | Wilcox et al. | |
| 4,594,040 A | 6/1986 | Molina | |
| 4,607,992 A | 8/1986 | Mauritz et al. | |
| 4,801,230 A | 1/1989 | Wilburn | |
| 4,818,166 A | 4/1989 | Szukay et al. | |
| 4,828,423 A | 5/1989 | Cramer, Jr. et al. | |
| 4,844,677 A | 7/1989 | Schwartzman | |
| 4,892,000 A | 1/1990 | Renk et al. | |
| 4,906,036 A | 3/1990 | James | |
| 4,911,726 A | 3/1990 | Warkentin | |
| 4,934,888 A | 6/1990 | Corsmeier et al. | |
| 4,971,497 A | 11/1990 | Stoffer et al. | |
| 4,979,858 A | 12/1990 | Van Allman et al. | |
| 4,981,390 A | 1/1991 | Cramer, Jr. et al. | |
| 4,999,019 A | 3/1991 | Kraus | |
| 5,094,579 A * | 3/1992 | Johnson | 411/107 |
| 5,106,250 A | 4/1992 | Fischer et al. | |
| 5,141,357 A | 8/1992 | Sherman et al. | |
| 5,201,625 A * | 4/1993 | Takenouchi et al. | 411/369 |
| 5,209,620 A | 5/1993 | Zare-Ardestani | |
| 5,232,322 A | 8/1993 | Regensburger | |
| 5,244,325 A | 9/1993 | Knohl | |
| 5,326,206 A | 7/1994 | Moore | |
| 5,328,311 A | 7/1994 | Knohl | |
| 5,364,109 A | 11/1994 | Sihon | |
| 5,395,194 A | 3/1995 | Johnson et al. | |
| 5,415,507 A | 5/1995 | Janusz et al. | |
| 5,427,355 A | 6/1995 | Sukonthapanich | |
| 5,428,895 A | 7/1995 | Sihon | |
| 5,462,395 A * | 10/1995 | Damm et al. | 411/107 |
| 5,486,122 A * | 1/1996 | Oda et al. | 439/752 |
| 5,492,343 A | 2/1996 | Smith et al. | |
| 5,509,752 A | 4/1996 | Kocisek | |
| 5,513,603 A | 5/1996 | Ang et al. | |
| 5,531,524 A | 7/1996 | Brouwer | |
| 5,537,783 A * | 7/1996 | Kazino et al. | 49/375 |
| 5,611,628 A | 3/1997 | Brouwer | |
| 5,707,192 A | 1/1998 | Vortriede et al. | |
| 5,807,052 A * | 9/1998 | Van Boven et al. | 411/353 |
| 5,823,752 A | 10/1998 | Hoenisch et al. | |
| RE36,164 E | 3/1999 | Johnson et al. | |
| 6,030,161 A | 2/2000 | Udell et al. | |
| 6,059,503 A | 5/2000 | Johnson | |
| 6,106,207 A | 8/2000 | Kuzdak, III | |
| 6,123,272 A | 9/2000 | Havican et al. | |
| 6,161,840 A | 12/2000 | Boardman et al. | |
| 6,176,665 B1 | 1/2001 | Bondarowicz et al. | |
| 6,192,849 B1 | 2/2001 | Powell | |
| 6,280,132 B1 | 8/2001 | Szczukowski et al. | |
| 6,286,471 B1 | 9/2001 | Powell | |
| 6,394,055 B2 | 5/2002 | Powell | |
| 6,435,427 B1 | 8/2002 | Conroy | |
| 6,457,925 B1 | 10/2002 | Genick, II | |
| 6,478,519 B1 | 11/2002 | Genick, II | |
| 6,663,330 B2 | 12/2003 | Powell | |
| 6,804,872 B2 | 10/2004 | Powell | |
| 6,872,040 B2 | 3/2005 | Deeg et al. | |
| 6,994,354 B2 | 2/2006 | Sakata | |
| 7,070,377 B2 | 7/2006 | Fonville | |
| 2004/0022600 A1 | 2/2004 | Kovac | |
| 2004/0109742 A1 | 6/2004 | Kovac | |
| 2004/0213645 A1 | 10/2004 | Kovac | |
| 2005/0025566 A1 | 2/2005 | Hasegawa | |

FOREIGN PATENT DOCUMENTS

| | | |
|---|---|---|
| DE | 37 06 616 | 9/1988 |
| DE | 40 07 941 | 9/1990 |
| GB | 855297 | 11/1960 |

* cited by examiner

Fig. 9

POWER SEAL BOLT ASSEMBLY

CROSS-REFERENCE TO RELATED APPLICATIONS

This application claims the benefit of U.S. Provisional Application No. 60/987,910, filed on Nov. 14, 2007. The entire disclosure of the above application is incorporated herein by reference.

FIELD

The present disclosure relates to devices and methods for use of pre-assembled fastener assemblies used to fasten a first workpiece to a second workpiece where the workpieces include different materials.

BACKGROUND

The statements in this section merely provide background information related to the present disclosure and may not constitute prior art.

Fastening members are widely used to join materials of different properties to one another including applications such as fastening plastic or polymeric parts such as covers and trim pieces to metal components or parts of an automobile vehicle assembly. One such device is disclosed in U.S. Pat. No. 5,807,052 to Van Boven et al. The '052 patent defines an assembly for bearing the load from a metallic fastener coupled through a plastic part to a vehicle metallic part. Several disadvantages exist for the design of the device of the '052 patent. These include the incorporation of a springing flange into the design of a sleeve which requires additional machining to achieve the springing function with the required clearance to permit the flange to deflect during assembly of the fastener. A further disadvantage is the fastener itself must be specially machined or formed having a protruding shank rib member to prevent the fastener from releasing from the sleeve assembly prior to installation.

Further disadvantages of the design of the '052 patent include a machining or forming process required on the internal bore of the sleeve to create a stop which engages the shank rib member. This machining or forming process removes material from the sleeve and is accomplished inside the sleeve bore and therefore generally increases the cost of the sleeve. A lower or second flange created on the sleeve further increases the cost of the sleeve by requiring an additional operation to create the flange or a machining operation to remove material to create the flange.

Plastic or polymeric components such as valve covers used in conjunction with an automobile vehicle engine block reduce the cost and weight of the cover, however the thermal cycling over time and/or the stress/strain over time of the cover can generate creep in the plastic material used for the cover and a subsequently loose connection between the cover and the engine block. A reduced complexity fastener assembly is therefore warranted for this application as well as additional applications where dissimilar materials are fastened.

SUMMARY

According to an embodiment of the present disclosure, a power seal bolt assembly includes a bolt having a head and a shaft having an unthreaded shaft portion and a threaded portion. A washer is fixed to the bolt proximate to the head. A compressible washer retainer frictionally engages the unthreaded shaft portion and contacts the head. The compressible washer retainer includes a retainer portion having flexible legs extending inwardly into a washer retainer through aperture. The flexible legs flex to frictionally engage the retainer portion to the unthreaded shaft portion. A compressible washer portion homogenously connected to the retainer portion is oriented to contact the washer when a bolt torque is applied. The compressible washer portion includes at least one raised ring contacting the washer to create a fluid seal at the washer; and at least one partial cavity permitting the compression washer portion to axially compress upon application of the torque.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
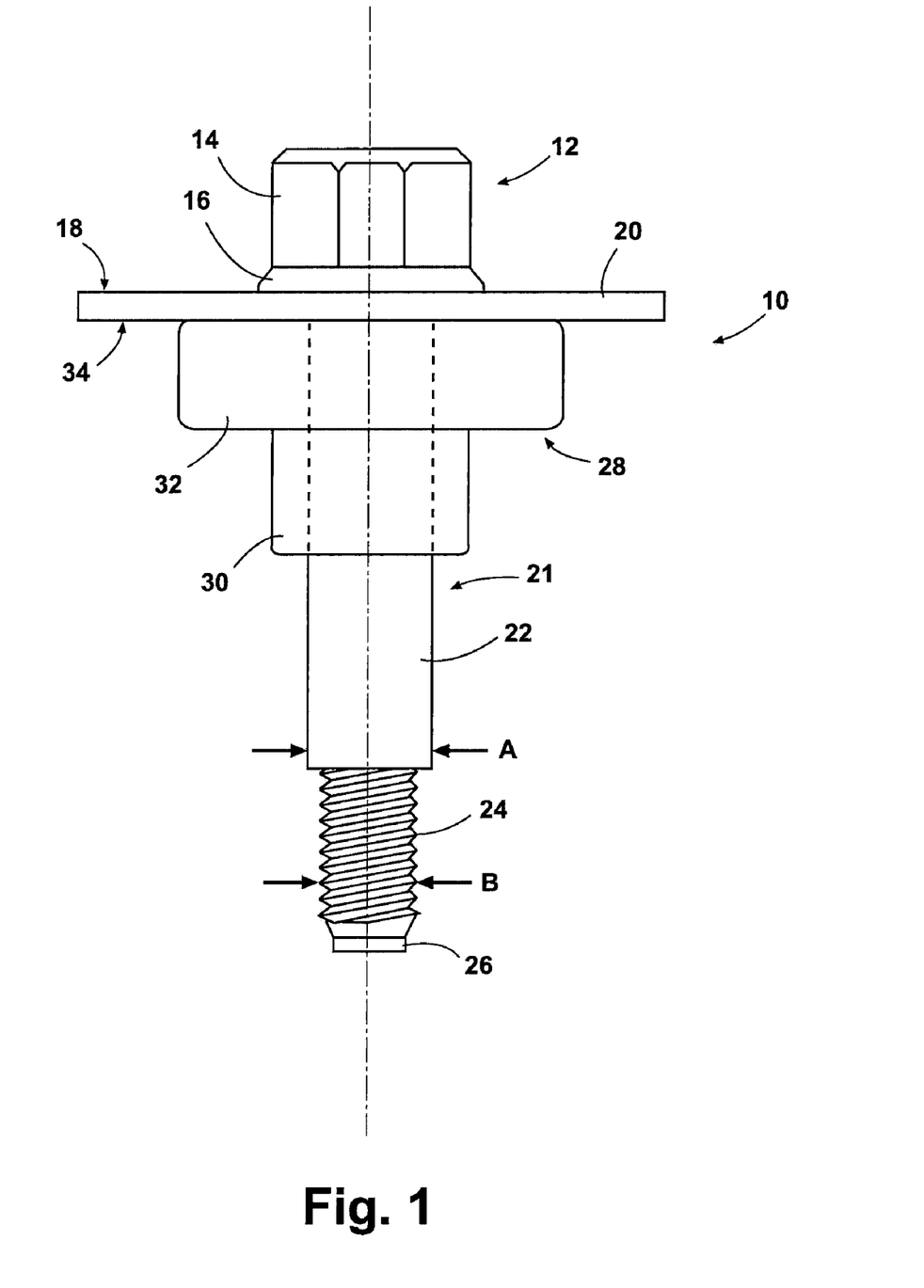
FIG. 1 is a front elevational view of a power seal bolt assembly of the present disclosure.

Referring to FIG. 1, a power seal bolt assembly 10 of the present disclosure can include a bolt 12 having a head 14 homogeneously connected to a head engagement flange 16. Head engagement flange 16 can abut against a first outer face 18 of a washer 20. Bolt 12 further includes a shaft 21 having an unthreaded shaft portion 22, a threaded portion 24, and an anti-cross-thread end 26. Unthreaded shaft portion 22 extends homogenously from head engagement flange 16, with threaded portion 24 and anti-cross-thread end 26 extending away from unthreaded shaft portion 22. Unthreaded shaft portion 22 has a shaft diameter "A". Threaded portion 24 has a thread pitch "B" which defines a diameter smaller than shaft diameter "A".

A polymeric material compressible washer retainer 28 which can by made by a molding operation is slidably fit over the unthreaded shaft portion 22. Compressible washer retainer 28 includes a retainer portion 30 which is adapted to slidably and frictionally engage the unthreaded shaft portion 22. Compressible washer retainer 28 further includes a compressible washer portion 32 homogenously connected to retainer portion 30. Compressible washer retainer 28 is slidably disposed over unthreaded shaft portion 22 until compressible washer portion 32 contacts a second inner face 34 of washer 20. Compressible washer retainer 28 is thereafter frictionally retained in the position shown in FIG. 1 by frictional engagement between retainer portion 30 and unthreaded shaft portion 22 which will be described in greater detail in reference to FIGS. 5-7.

Figure 2:
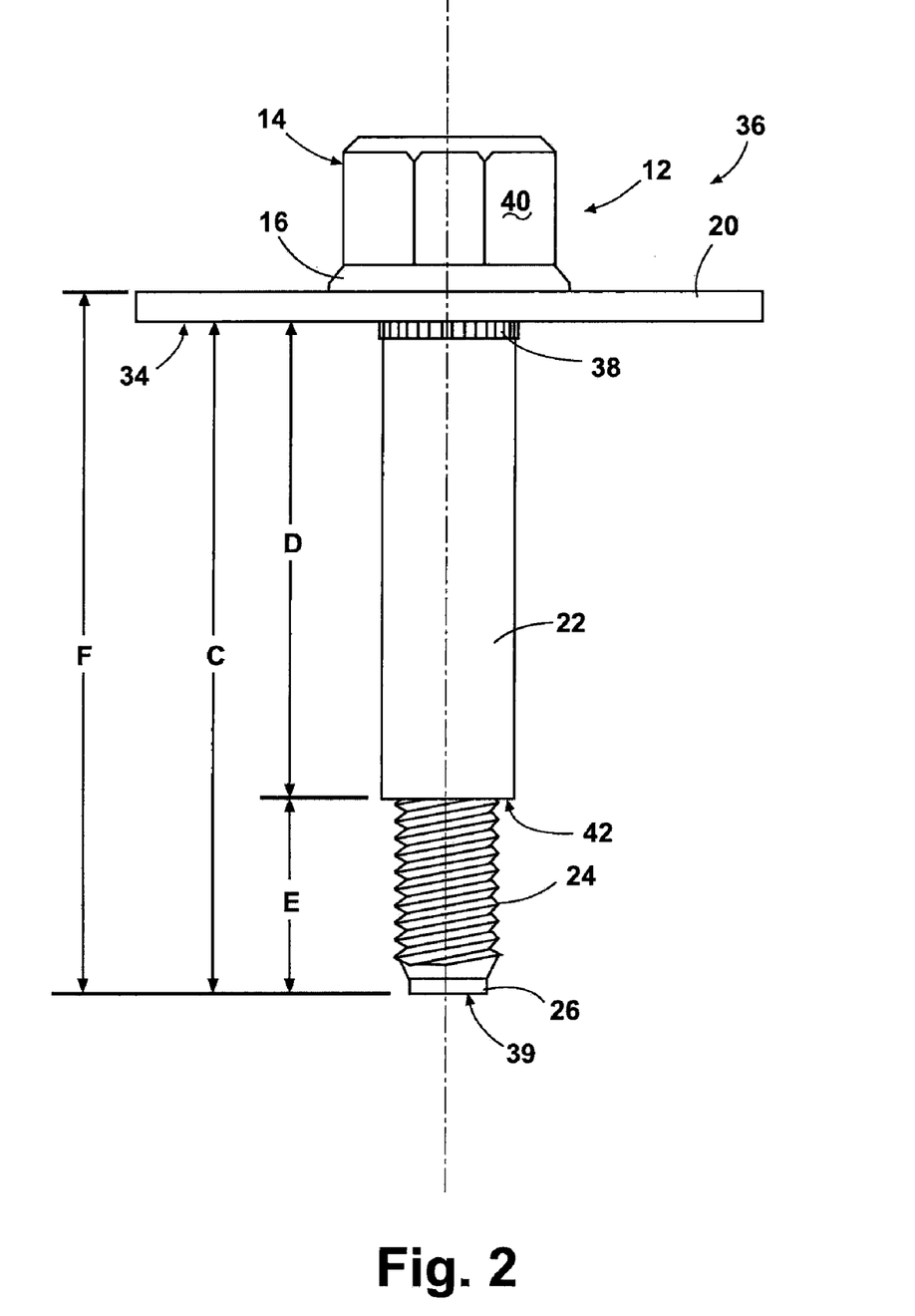
FIG. 2 is a front elevational view of a bolt-washer assembly for the power seal bolt assembly of FIG. 1.

Referring to FIG. 2 and back to FIG. 1, prior to installation of compressible washer retainer 28 a bolt-washer assembly 36 is created by sliding washer 20 over the unthreaded shaft portion 22 of bolt 12. A positive engagement feature 38 such as a knurl is created after washer 20 engages head engagement flange 16 so that washer 20 is fixedly retained in contact with head engagement flange 16. In the assembled condition shown, bolt-washer assembly 36 has a working stem length "C" measured from the second inner face 34 to a free end 39 of anti-cross-thread end 26. Working stem length "C" includes a shaft length "D" of unthreaded shaft portion 22 plus a threaded portion length "E" of threaded portion 24 and anti-cross-thread end 26. Each of working stem length "C", shaft length "D", and threaded portion length "E" can be varied at the discretion of the manufacturer to suit different engagement lengths for bolt 12. A total stem length "F" is measured from head engagement flange 16 to the free end 39. Working stem length "C" differs from total stem length "F" by a thickness of washer 20. According to several embodiments head 14 is provided with a plurality of engagement faces 40 defining a geometric shape such as a hexagon for head 14. The quantity of engagement faces 40 is predetermined to suit a standard tool size used for installation of bolt 12.

Figure 3:
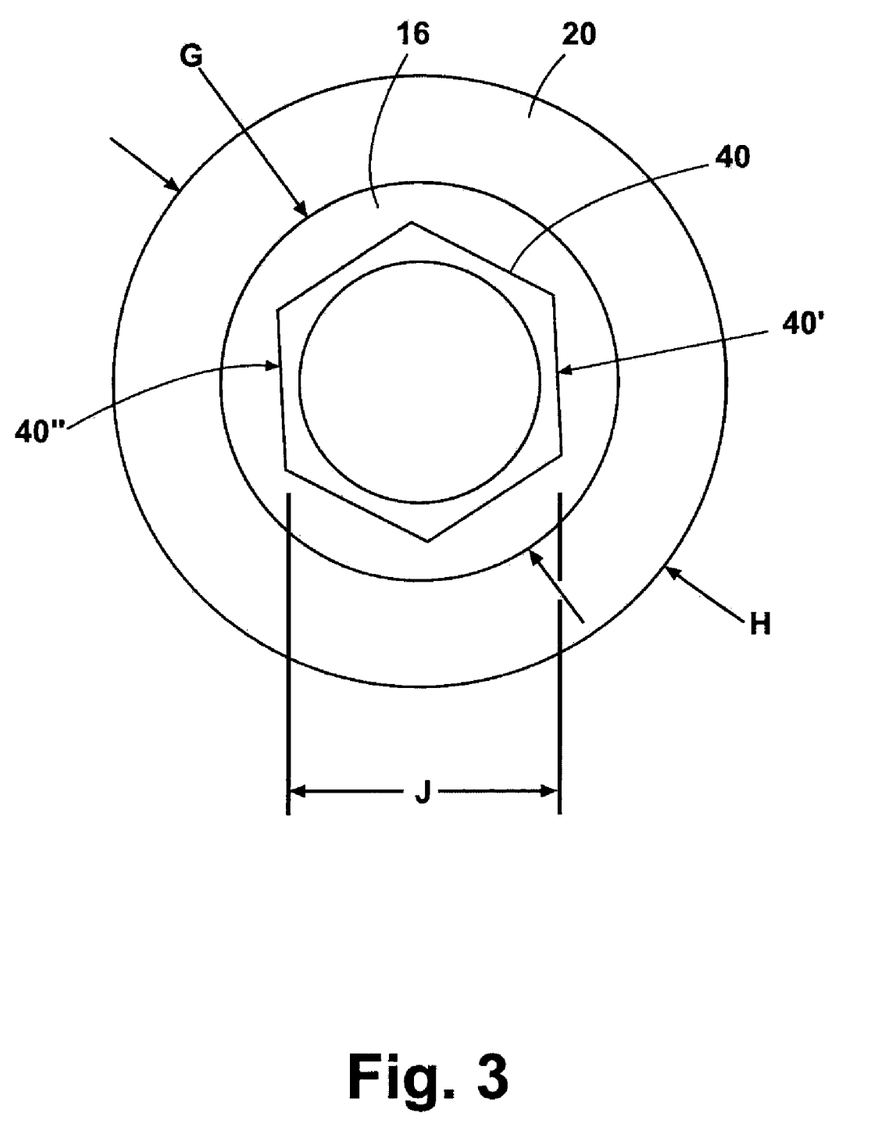
FIG. 3 is a top plan view of the bolt-washer assembly of FIG. 2.

Referring to FIG. 3, head engagement flange 16 has an engagement flange diameter "G", and washer 20 has a washer diameter "H" which is larger than engagement flange diameter "G". A flat-to-flat spacing dimension "J" is common between opposing ones of the engagement faces 40, for example between engagement faces 40' and 40".

Figure 4:
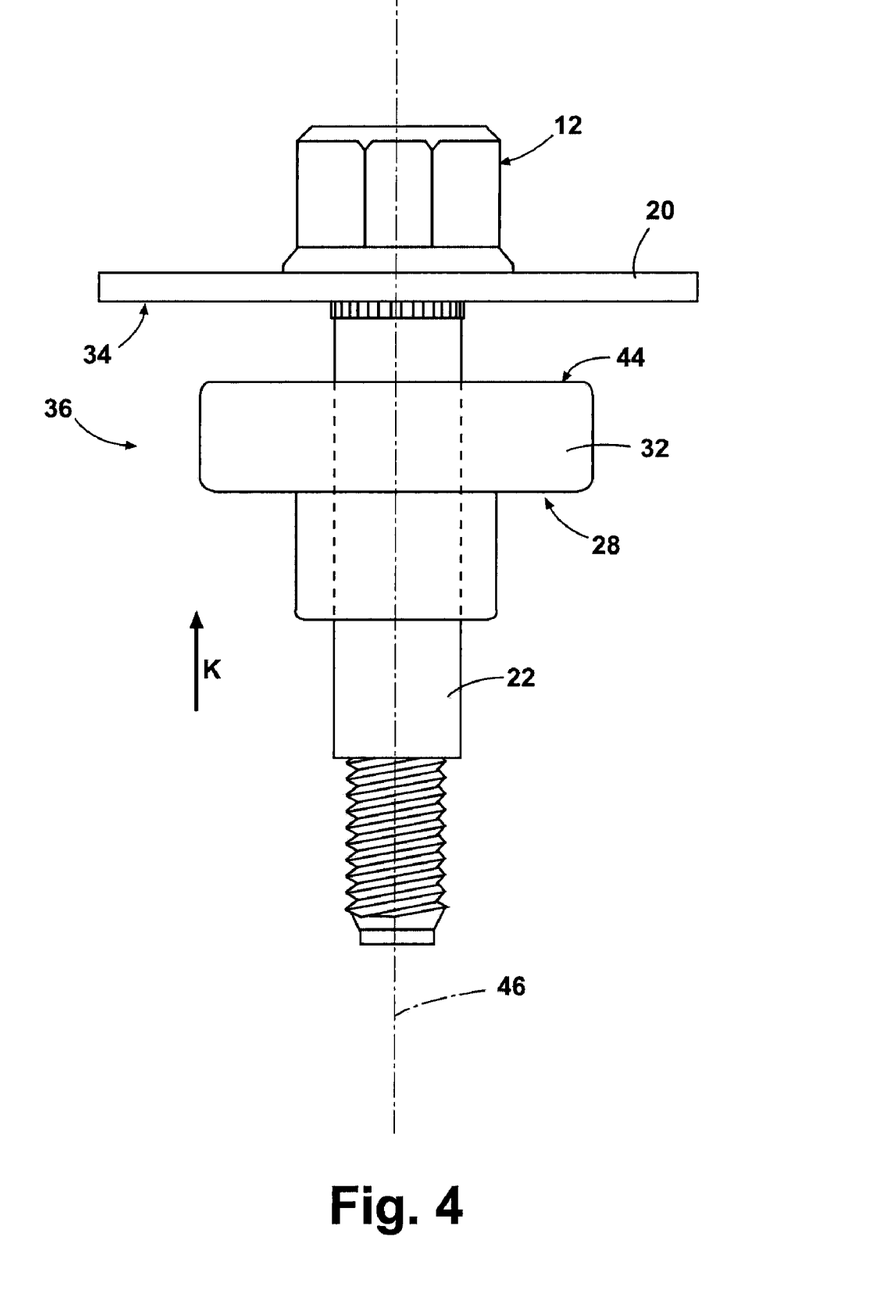
FIG. 4 is a front elevational view of a partially assembled power seal bolt assembly of FIG. 1.

Referring to FIG. 4, after assembly of bolt-washer assembly 36, compressible washer retainer 28 is slidably disposed over unthreaded shaft portion 22 in an installation direction "K" until a contact end 44 of compressible washer portion 32 contacts second inner face 34 of washer 20. Compressible washer retainer 28 and unthreaded shaft portion 22 are each co-axially aligned with a longitudinal axis 46 of bolt 12.

Figure 5:
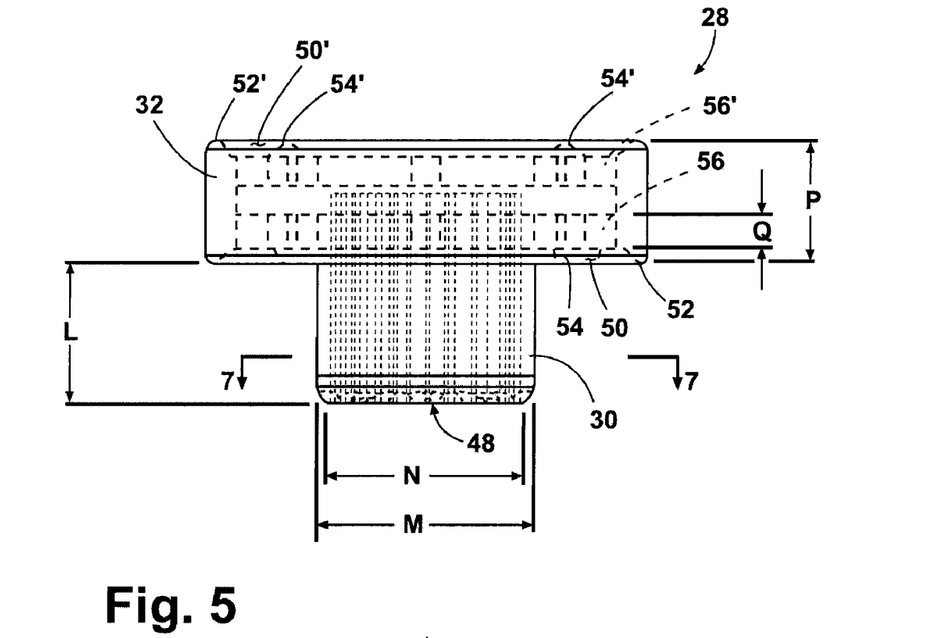
FIG. 5 is a front elevational view of a compressible washer retainer of the present disclosure.
Figure 6:
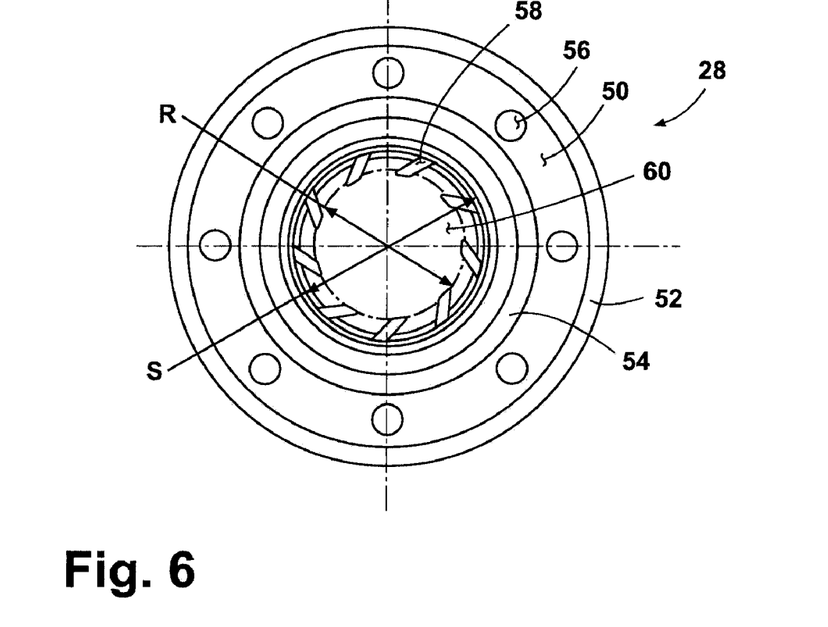
FIG. 6 is a top plan view of the compressible washer retainer of FIG. 5.

Referring to FIGS. 5 and 6, compressible washer retainer 28 is created by co-molding compressible washer portion 32 with the retainer portion 30 during a molding process such as an injection molding process. Retainer portion 30 is modified from the retainer disclosed in U.S. Pat. No. 7,073,997, issued Jul. 11, 2006, and commonly owned by the assignee of the present disclosure, the subject matter of which is incorporated herein by reference.

Retainer portion 30 has a retainer length "L", a retainer outer diameter "M", and a retainer end diameter "N" measured at a retainer free end 48 of retainer portion 30. A circular-shaped slot 50 is created on opposed sides or faces of compressible washer portion 32 and positioned between each of a first outer raised ring 52 and a second inner raised ring 54. First and second outer and inner raised rings 52, 54 are duplicated as substantially mirror images of each other formed on an opposite side of compressible washer portion 32 and are therefore identified as first and second outer and inner raised rings 52', 54' on an upwardly directed face of compressible washer portion 32 as viewed in FIG. 5. A plurality of partial cavities 56 are created in the faces defined by circular slots 50, 50'. In the example shown, eight partial cavities 56 are formed in each of the faces defined by circular slots 50, 50' however this quantity can vary above or below the quantity of eight at the discretion of the manufacturer. Partial cavities 56, 56' are provided in part to allow for compression of compressible washer portion 32 when an axial load from bolt 12 (not shown in this view) is induced on compressible washer portion 32 by applying a torque to bolt 12.

Compressible washer portion 32 has a washer portion length "P". Each of the partial cavities 56, 56' have a partial cavity depth "Q". A depth of circular slots 50, 50' can also be controlled by the manufacturer to provide additional capability for compression or to resist compression of compressible washer portion 32. First and second outer and inner raised rings 52, 54 also provide fluid seal function as a seal for fluids or gasses when compressible washer portion 32 is compressed during use.

Referring more specifically to FIGS. 1 and 6, a plurality of flexible legs 58 extend into a through aperture 60 of compressible washer retainer 28. Free ends of each of the flexible legs 58 define a flexible leg contact circle "R" which is smaller than shaft diameter "A" of unthreaded shaft portion 22. This difference in diameter dimension induces the flexible legs 58 to deflect outwardly when compressible washer retainer 28 is disposed onto unthreaded shaft portion 22 of bolt 12. Clearance for deflection of each of the flexible legs 58 as unthreaded shaft portion 22 is received is provided by a clearance provided between flexible leg contact circle "R" and an inner wall diameter "S" of retainer portion 30.

Figure 7:
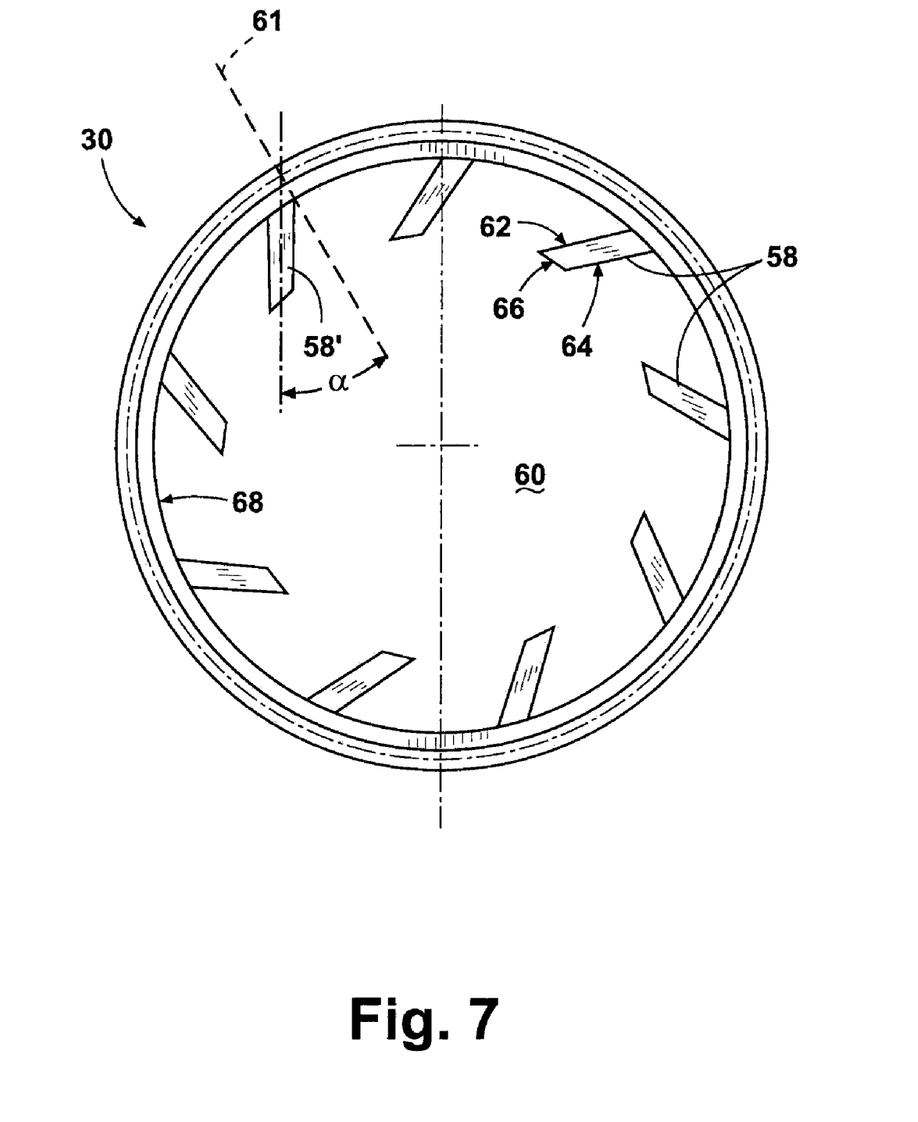
FIG. 7 is a cross sectional plan view taken at section 7 of FIG. 5 of the retainer portion of the compressible washer retainer.

Referring now to FIG. 7, a quantity of eight (8) flexible legs 58 are shown, however the quantity of flexible legs 58 can vary either above or below the quantity of eight at the discretion of the manufacturer and to suit the required frictional contact if shaft diameter "A" of unthreaded shaft portion 22 changes for different embodiments. Each of the flexible legs 58 such as exemplary flexible leg 50' defines a leg orientation angle α with respect to a reference line 61 oriented normal to an inner wall 68 of retainer portion 30. Each of the flexible legs 58 has a first leg face 62 and an opposite second leg face 64 each commonly oriented with respect to the other flexible legs 58. A leg free end 66 of each of the flexible legs 58 is oriented to face the unthreaded shaft portion 22 (not shown) of bolt 12 in the as-molded condition of retainer portion 30. Each of the flexible legs 58 are homogenously created and extend into through aperture 60 from inner wall 68 with retainer portion 30 in an as-molded condition.

Referring to FIG. 8 and again to FIG. 5, a completed installation 70 of power seal bolt assembly 10 utilizes power seal bolt assembly 10 to releasably fasten a polymeric member 72 such as a valve head cover for an automobile engine to a metal member 74 such as an engine block. Completed installation 70 is provided by inserting power seal bolt assembly 10 in an insertion direction "T" such that compressible washer portion 32 is received in a counter-bore 76 created in polymeric member 72. At the same time, retainer portion 30 is frictionally received within a through aperture 78 of polymeric member 72. A through aperture diameter "V" of through aperture 78 is smaller than retainer outer diameter "M" of retainer portion 30 such that an interference or frictional fit is obtained between retainer portion 30 and an inner wall 79 defined by through aperture 78.

Threaded portion 24 of bolt 12 is threadably engaged with a threaded bore 80 created in metal member 74. Threaded bore 80 can be a closed bore such as the bore shown in FIG. 8, or can also be a through threaded bore at the discretion of the manufacturer. Bolt 12 is rotated to complete the installation 70 such that threaded portion 24 in engagement with threaded bore 80 further pulls bolt 12 in the insertion direction "T" until shaft end face 42 of unthreaded shaft portion 22 contacts a contact surface 82 of metal member 74. A counter-bore depth "U" of counter-bore 76 is less than the washer portion length "P" of compressible washer portion 32. The greater thickness or length of compressible washer portion 32 compared to counter-bore depth "U" promotes compression of compressible washer portion 32 as bolt 12 is torqued into position. Axial compression of compressible washer portion 32 continues until second inner face 34 of washer 20 contacts a member outer surface 84 of polymeric member 72. During compression of compressible washer portion 32, the first and second outer and inner raised rings 52, 52' and 54, 54' respectively create fluid seals with each of the second inner face 34 of washer 20 and a counter-bore end face 86 of counter-bore 76. Contact between shaft end face 42 of unthreaded shaft portion 22 and the contact surface 82 of metal member 74 also creates a compression limiting capability for power seal bolt assembly 10 to limit the compressive force applied to polymeric member 72 by bolt 12.

Referring again to each of FIGS. 4 and 8, with compressible washer retainer 28 positioned on unthreaded shaft portion 22 as shown in FIG. 4, the bolt-washer assembly 36 can be received within polymeric member 72 such that frictional contact between retainer portion 30 and inner wall 79 of polymeric member 72 will retain power seal bolt assembly 10 in frictional engagement with polymeric member 72 prior to engagement between threaded portion 24 and threaded bore 80 of metal member 74. This provides a capability of preloading power seal bolt assemblies 10 in one or more locations of polymeric member 72 for shipment of polymeric member 72 to an installation facility and subsequent installation of polymeric member 72 with metal member 74. With further reference also to FIG. 7, bolt 12 is frictionally held by contact with each of the flexible legs 58 during this interim period and before the completed installation 70 of FIG. 8 is created.

Figure 8:
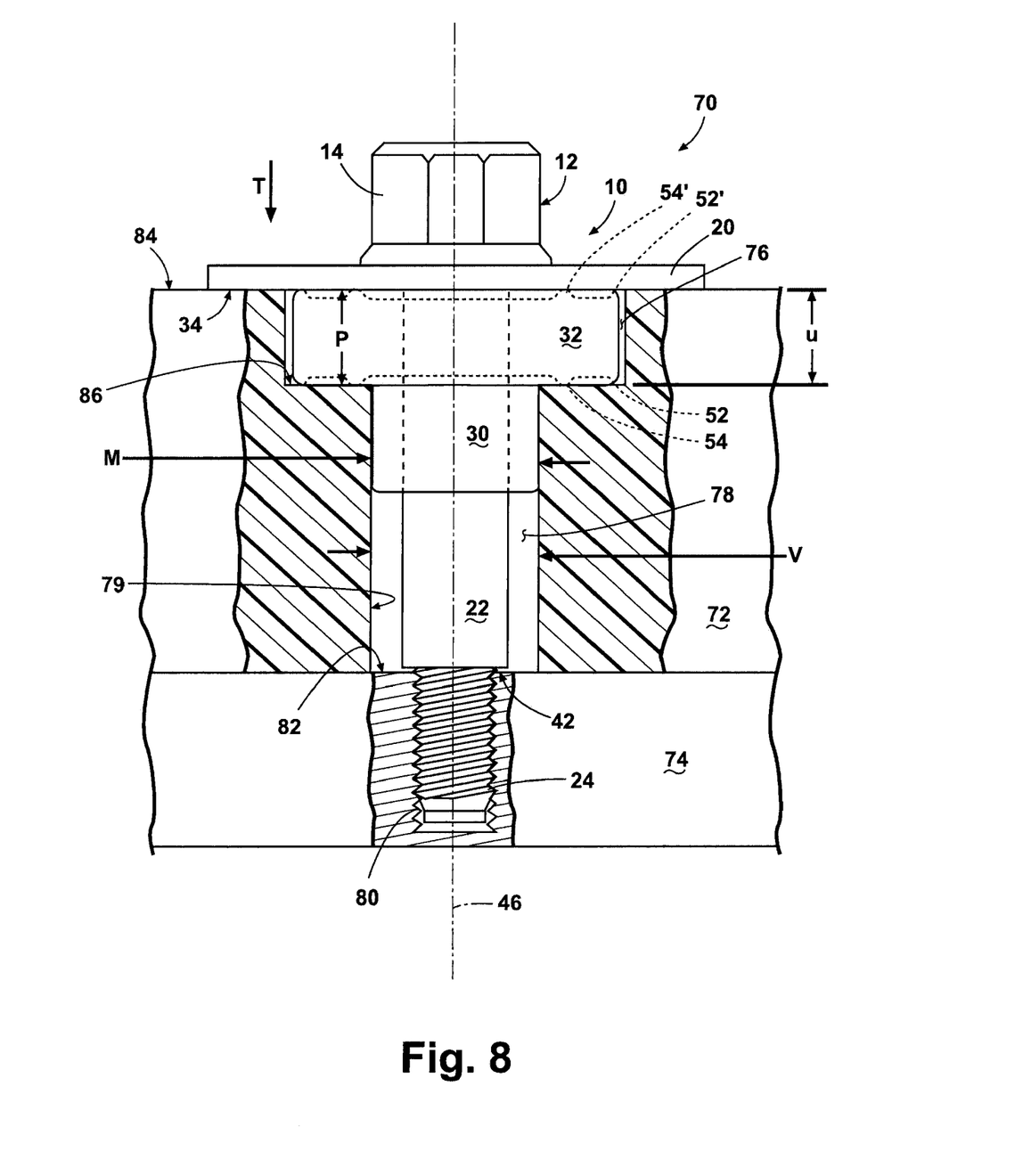
FIG. 8 is a partial cross sectional elevational view of a completed installation of a power seal bolt assembly of the present disclosure.

Referring to FIG. 9, and again to FIGS. 5 and 8, a completed installation 70' of power seal bolt assembly 10' utilizes power seal bolt assembly 10' to releasably fasten a polymeric member 72' such as a valve head cover for an automobile engine to metal member 74 such as an engine block. Polymeric member 72' is modified from polymeric member 72 to include a reduced total height "W" and to eliminate counter-bore 76. A compressible washer portion 32' is modified from compressible washer portion 32 such that compressible washer portion 32' is adapted to separately receive a retainer portion 30' such that compressible washer portion 32' and retainer portion 30' are not required to be homogenously connected. Retainer portion 30' can include an insertion portion 88 partially received in and frictionally engaged by compressible washer portion 32'. Completed installation 70' is created by inserting power seal bolt assembly 10 in insertion direction "T" such that compressible washer portion 32' directly contacts an outer facing surface 90 of polymeric member 72'. At the same time, retainer portion 30' is frictionally received within a through aperture 78' of polymeric member 72'. A through aperture diameter "V" of through aperture 78' is smaller than retainer outer diameter "M" of retainer portion 30' such that an interference or frictional fit is obtained between retainer portion 30' and an inner wall 79' defined by through aperture 78'.

Figure 9:
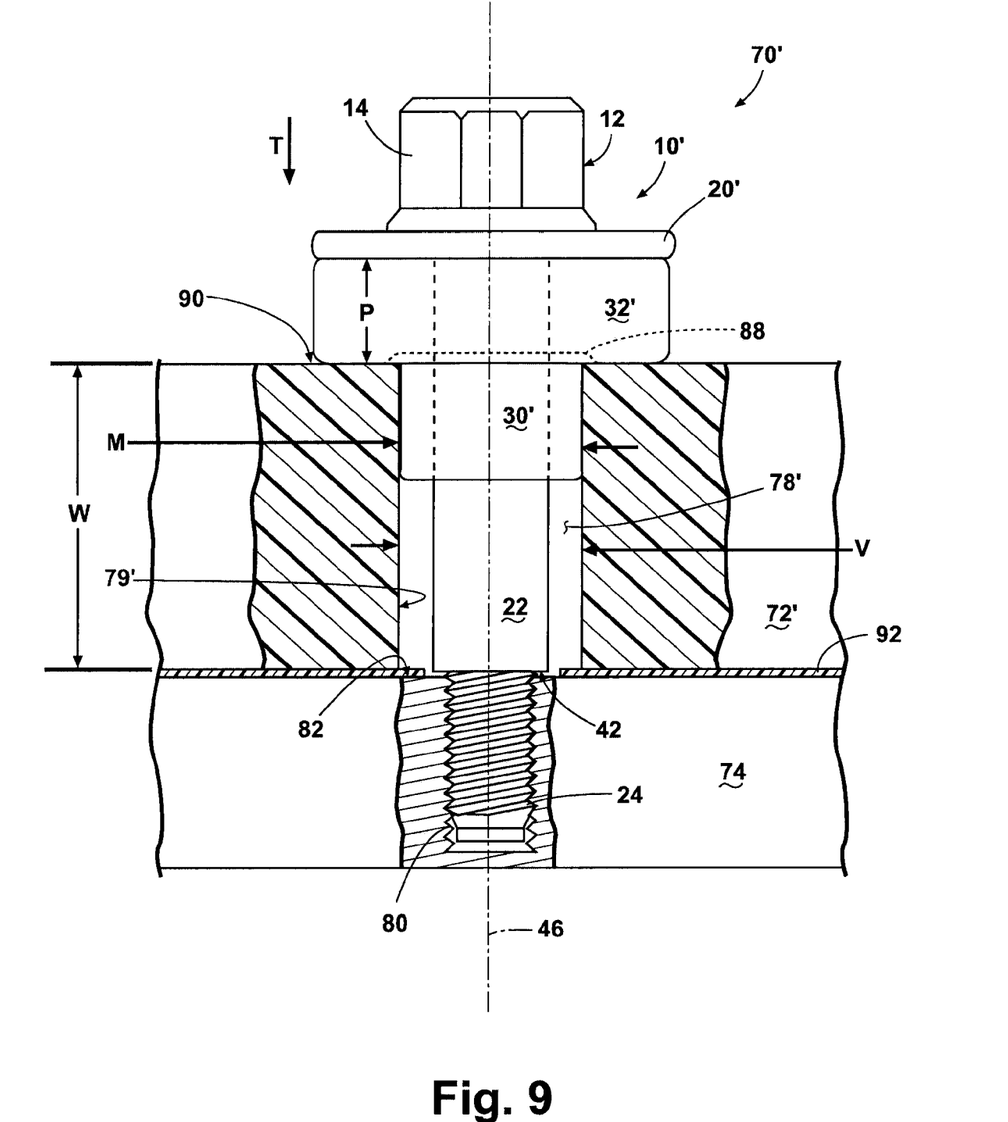
FIG. 9 is a partial cross sectional elevational view of a completed installation of an additional embodiment of a power seal bolt assembly of the present disclosure.

Threaded portion 24 of bolt 12 is threadably engaged with threaded bore 80 created in metal member 74. Bolt 12 is rotated to complete the installation 70' such that threaded portion 24 in engagement with threaded bore 80 further pulls bolt 12 in the insertion direction "T" until shaft end face 42 of unthreaded shaft portion 22 contacts the contact surface 82 of metal member 74. During threaded engagement of threaded portion 24 washer portion length "P" of compressible washer portion 32' is reduced by compression of compressible washer portion 32', and a gasket 92 installed between polymeric member 72' and metal member 74 is also partially compressed.

Combined axial compression of compressible washer portion 32' and gasket 92 continues until shaft end face 42 of unthreaded shaft portion 22 contacts contact surface 82 of metal member 74. During compression of compressible washer portion 32'. With further reference to FIG. 8, the first and second outer and inner raised rings 52, 52' and 54, 54' can be entirely eliminated from compressible washer portion 32', or only one each of first and second outer and inner raised rings 52 or 52' and 54 or 54' can be used. In several embodiments, a diameter of a modified washer 20' can be substantially equal to a diameter of compressible washer portion 32'.

Power seal bolt assemblies 10, 10' of the present disclosure provide several advantages. By co-molding and combining or frictionally engaging the compressible washer portion 32 with the retainer portion 30 to create compressible washer retainer 28, a one-piece molded part or a frictionally engaged assembly can be used which provides both a retention capability for bolt 12 and frictional engagement of compressible washer retainer 28 with polymeric member 72 so the power seal bolt assembly 10 can be pre-inserted and shipped with polymeric member 72. By providing a compressible feature of compressible washer portion 32 a fluid-tight seal can also be created when power seal bolt assemblies 10 of the present disclosure are torqued into position. In addition, by incorporating the shaft end face 42 onto unthreaded shaft portion 22 of bolt 12 a compression limiting capability is also provided for power seal bolt assembly 10. The compressible feature of compressible washer portion 32 also includes compensation for misalignment and construction tolerances between the first and second workpieces. Also, by controlling a total length of unthreaded shaft portion 22 and threaded portion 24 of bolt 12, different thicknesses for the polymeric member 72 can be accommodated using a commonly sized compressible washer retainer 28 of the present disclosure.

What is claimed is:

1. A power seal bolt assembly, comprising:
  a bolt having a head, a head engagement flange, and a shaft extending from the head engagement flange having an unthreaded shaft portion proximate the head engagement flange and a threaded portion; and
  a polymeric compressible washer retainer, including:
    a retainer portion having flexible legs extending inwardly into a through aperture of the compressible washer retainer, the flexible legs adapted to flex to frictionally engage the retainer portion to the unthreaded shaft portion; and
    a compressible washer portion positioned between the retainer portion and the head engagement flange, the compressible washer portion adapted to axially compress upon application of a torque to the bolt;
  a washer slidably received on the unthreaded shaft portion of the bolt and in contact with the head engagement flange;
  a contact face of the compressible washer portion adapted to contact the washer; and a positive engagement feature created in the unthreaded shaft portion after installation of the washer, the positive engagement feature preventing removal of the washer.

2. The power seal bolt assembly of claim 1, wherein the positive engagement feature comprises a knurl.

3. The power seal bolt assembly of claim 1, wherein the compressible washer portion is homogenously connected to the retainer portion.

4. A power seal bolt assembly, comprising:
a bolt having a head, a head engagement flange, and a shaft extending from the head engagement flange having an unthreaded shaft portion proximate the head engagement flange and a threaded portion; and
a polymeric compressible washer retainer, including:
   a retainer portion having flexible legs extending inwardly into a through aperture of the compressible washer retainer, the flexible legs adapted to flex to frictionally engage the retainer portion to the unthreaded shaft portion; and
   a compressible washer portion positioned between the retainer portion and the head engagement flange, the compressible washer portion adapted to axially compress upon application of a torque to the bolt, the compressible washer portion including at least one raised ring and at least one partial cavity permitting the compressible washer portion to axially compress upon application of the torque to the bolt.

5. The power seal bolt assembly of claim 4, wherein the at least one raised ring is adapted to contact the washer to create a fluid seal at the washer.

6. The power seal bolt assembly of claim 4, wherein the at least one raised ring includes first and second raised rings separated by a slot.

7. The power seal bolt assembly of claim 6, wherein the at least one partial cavity is positioned in the slot between the first and second raised rings.

8. A power seal bolt assembly, comprising:
a bolt having a head, a head engagement flange, and a shaft extending from the head engagement flange having an unthreaded shaft portion proximate the head engagement flange and a threaded portion; and
a polymeric compressible washer retainer, including:
   a retainer portion having flexible legs extending inwardly into a through aperture of the compressible washer retainer, the flexible legs adapted to flex to frictionally engage the retainer portion to the unthreaded shaft portion, each of the flexible legs define a leg orientation angle with respect to a reference line oriented normal to an inner wall of the retainer portion, each of the flexible legs includes a first leg face and an opposite second leg face each commonly oriented with respect to the other flexible legs, and the flexible legs are homogenously connected to an inner wall of the retainer portion and extend into the through aperture; and
   a compressible washer portion positioned between the retainer portion and the head engagement flange, the compressible washer portion adapted to axially compress upon application of a torque to the bolt.

9. A power seal bolt assembly, comprising:
a bolt having a head, a shaft extending from the head having an unthreaded shaft portion proximate the head and a threaded portion;
a washer slidably received over the shaft and positioned in contact with the head and fixed in contact with the head by a positive engagement feature created in the unthreaded shaft portion;

a polymeric compressible washer retainer frictionally engaged with the unthreaded shaft portion and adapted to contact the washer, the compressible washer retainer including:
   a retainer portion having flexible legs extending inwardly into a through aperture of the compressible washer retainer, the flexible legs adapted to flex outwardly when the retainer portion is slidably received onto the unthreaded shaft portion to frictionally engage the retainer portion to the unthreaded shaft portion; and
   a compressible washer portion positioned between the retainer portion and the washer.

10. The power seal bolt assembly of claim 9, wherein the compressible washer portion further includes at least one raised ring adapted to contact the washer to create a fluid seal at the washer.

11. The power seal bolt assembly of claim 9, wherein the compressible washer portion further includes at least one partial cavity permitting the compressible washer portion to axially compress.

12. The power seal bolt assembly of claim 9, wherein each of the flexible legs define a leg orientation angle with respect to a reference line oriented normal to an inner wall of the retainer portion.

13. The power seal bolt assembly of claim 9, wherein each of the flexible legs includes a first leg face and an opposite second leg face each commonly oriented with respect to the other flexible legs.

14. The power seal bolt assembly of claim 9, wherein:
each of the flexible legs includes a leg free end oriented to face the unthreaded shaft portion of the bolt, and
the flexible legs are homogenously connected to an inner wall of the retainer portion and extend into the through aperture from the inner wall.

15. A power seal bolt component assembly, comprising:
a bolt having a head, a head engagement flange, and a shaft extending from the head engagement flange having an unthreaded shaft portion proximate the head and a threaded portion;
a polymeric compressible washer retainer frictionally engaged with the unthreaded shaft portion and adapted to contact the head engagement flange, the compressible washer retainer including:
   a retainer portion having a plurality of flexible legs extending inwardly into a through aperture of the compressible washer retainer, the flexible legs adapted to flex to frictionally engage the retainer portion to the unthreaded shaft portion; and
   a compressible washer portion homogenously connected to the retainer portion and positioned between the washer and the retainer portion, the compressible washer portion having a washer portion length;
a polymeric member having a counter-bore, the bolt having the compressible washer retainer connected thereto inserted through the polymeric member such that the compressible washer portion is received in the counter bore, and
a counter-bore depth of the counter-bore being less than the washer portion length of the compressible washer portion.

16. The assembly of claim 15, wherein the polymeric member includes a through aperture coaxially aligned with the counter-bore, wherein simultaneously during insertion of the bolt the retainer portion is frictionally received within the through aperture.

17. The assembly of claim 16, further including an inner wall defined by the through aperture having a diameter smaller than an outer diameter of the retainer portion such that a frictional fit is created between the retainer portion and the inner wall.

18. The assembly of claim 15, further including a metal member, wherein the threaded portion of the bolt is threadably engaged with a threaded bore created in the metal member.

19. The assembly of claim 18, further including:

a shaft end face of the unthreaded shaft portion; and a contact surface of the metal member;

wherein the bolt is rotatable such that the threaded portion in threaded engagement with the threaded bore operates to pull the bolt in an insertion direction until the shaft end face of the unthreaded shaft portion contacts the contact surface of the metal member precluding further compression of the compressible washer portion.

20. The assembly of claim 15, wherein the compressible washer portion includes:

at least one raised ring; and at least one partial cavity proximate the at least one raised ring permitting the compressible washer portion to axially compress upon application of a torque to the bolt.

* * * * *